(12) United States Patent
Swinkels et al.

(10) Patent No.: US 10,333,777 B2
(45) Date of Patent: Jun. 25, 2019

(54) CONFIGURING A SECURE NETWORK INFRASTRUCTURE DEVICE

(71) Applicant: Ciena Corporation, Hanover, MD (US)

(72) Inventors: Gerard Leo Swinkels, Ottawa (CA); Craig Warren Parker, Kanata (CA)

(73) Assignee: Ciena Corporation, Hanover, MD (US)

( * ) Notice: Subject to any disclaimer, the term of this patent is extended or adjusted under 35 U.S.C. 154(b) by 630 days.

(21) Appl. No.: 13/960,654

(22) Filed: Aug. 6, 2013

(65) Prior Publication Data
US 2015/0043553 A1 Feb. 12, 2015

(51) Int. Cl.
*H04L 12/24* (2006.01)
*H04L 29/08* (2006.01)

(52) U.S. Cl.
CPC ........ *H04L 41/0806* (2013.01); *H04L 41/082* (2013.01); *H04L 41/24* (2013.01); *H04L 67/10* (2013.01); *H04L 67/34* (2013.01)

(58) Field of Classification Search
CPC ... H04L 41/082; H04L 41/0806; H04L 67/10; H04L 67/34
USPC ............... 709/220; 370/254; 358/1.13, 1.15
See application file for complete search history.

(56) References Cited

U.S. PATENT DOCUMENTS

| | | | | |
|---|---|---|---|---|
| 6,453,413 | B1 * | 9/2002 | Chen | G06F 8/63 709/221 |
| 7,626,944 | B1 * | 12/2009 | Riddle | H04L 41/0806 370/254 |
| 7,873,164 | B1 * | 1/2011 | Wertenbruch | H04L 63/08 380/255 |
| 8,971,209 | B2 * | 3/2015 | Magnuson | H04W 24/02 370/216 |
| 9,471,328 | B2 * | 10/2016 | Fukasawa | G06F 21/608 |
| 2007/0087738 | A1 * | 4/2007 | Melkesetian | H04W 16/24 455/422.1 |
| 2007/0115883 | A1 * | 5/2007 | Narayanan et al. | 370/331 |
| 2007/0268506 | A1 * | 11/2007 | Zeldin | H04L 41/0806 358/1.13 |
| 2007/0268514 | A1 * | 11/2007 | Zeldin | H04L 41/0213 358/1.15 |
| 2007/0268515 | A1 * | 11/2007 | Freund | H04L 67/34 358/1.15 |

(Continued)

*Primary Examiner* — Ranodhi Serrao
*Assistant Examiner* — James N Fiorillo
(74) *Attorney, Agent, or Firm* — Clements Bernard Walker PLLC; Christopher L. Bernard; Lawrence A. Baratta, Jr.

(57) ABSTRACT

In an embodiment, a user equipment (UE), establishes a local connection (e.g., USB, Bluetooth, etc.) to a network infrastructure device (e.g., a network switch or router) that is not yet configured for operation on a communications network. The UE obtains, while connected to the network infrastructure device over the local connection, device-identifying information (e.g., a location of the UE, a pre-provisioned identifier for the network infrastructure device, etc.) by which the network infrastructure device can be distinguished from other network infrastructure devices of the same type. The UE loads a configuration installation file that is specially configured for the network infrastructure device based on the obtained device-identifying information. The UE executes the configuration installation file over the local connection to configure the network infrastructure device for operation on the communications network.

19 Claims, 13 Drawing Sheets

(56) References Cited

U.S. PATENT DOCUMENTS

| | | | |
|---|---|---|---|
| 2007/0268516 A1* | 11/2007 | Bugwadia | H04L 67/34 358/1.15 |
| 2009/0037899 A1* | 2/2009 | Dharap | G06F 8/65 717/173 |
| 2009/0119660 A1* | 5/2009 | Redpath | G06F 8/61 717/175 |
| 2010/0180016 A1* | 7/2010 | Bugwadia | G06F 9/4411 709/220 |
| 2013/0060862 A1* | 3/2013 | Douillet | G06Q 10/10 709/206 |
| 2013/0191885 A1* | 7/2013 | Hubner et al. | 726/5 |
| 2014/0155085 A1* | 6/2014 | Kosseifi | H04W 24/10 455/456.1 |
| 2014/0315571 A1* | 10/2014 | Saari | H04W 64/00 455/456.1 |
| 2015/0004935 A1* | 1/2015 | Fu | 455/411 |
| 2015/0016241 A1* | 1/2015 | Ruffini et al. | 370/216 |
| 2015/0113521 A1* | 4/2015 | Suzuki | G06F 8/65 717/173 |
| 2015/0193216 A1* | 7/2015 | Li | H01M 1/72525 717/175 |

* cited by examiner

CONFIGURING A SECURE NETWORK INFRASTRUCTURE DEVICE

BACKGROUND OF THE INVENTION

1. Field of the Invention

Embodiments of the invention relate to configuring a secure network infrastructure device.

2. Description of the Related Art

Network infrastructure devices, such as routers or switches, are deployed in various locations to implement network functions pertaining to a data network. Generally, these network infrastructure devices require custom configuration, with each network infrastructure device requiring a configuration that is suitable for its particular implementation. It is common for network infrastructure devices to be delivered to their installation location without being pre-configured for implementation. In other words, a technician at the installation location cannot simply connect the network infrastructure device to the data network and expect it to function properly. One reason for this procedure is that network infrastructure devices are generally associated with a high level of security, and technicians that are on-site at the installation location need to verify that the network infrastructure devices are operating correctly.

For this reason, the technician will typically configure the network infrastructure devices him/herself. The configuration can implemented manually, whereby the technician will load a configuration tool and then navigate through a series of configuration screen menus until the configuration is complete. Alternatively, to expedite this procedure, the custom configurations for the network infrastructure devices can be loaded onto physical media, such as Universal Serial Bus (USB) sticks, and then labeled so that the technician will be able to associate each USB stick with its corresponding network infrastructure device. In this case, the custom configurations are generated in advance at a central site, which saves the technician time during the actual on-site installations. However, in a USB stick scenario, proper installation is dependent upon the USB sticks being labeled appropriately so that the technician not confuse the USB sticks and install the wrong configuration onto a network infrastructure device. Also, even if labeled appropriately, it can simply be difficult for the technician to keep track of a group of USB sticks if that technician has several installation jobs on his/her schedule.

SUMMARY

In an embodiment, a user equipment (UE), establishes a local connection (e.g., USB, Bluetooth, etc.) to a network infrastructure device (e.g., a network switch or router) that is not yet configured for operation on a communications network. The UE obtains, while connected to the network infrastructure device over the local connection, device-identifying information (e.g., a location of the UE, a pre-provisioned identifier for the network infrastructure device, etc.) by which the network infrastructure device can be distinguished from other network infrastructure devices of the same type. The UE loads a configuration installation file that is specially configured for the network infrastructure device based on the obtained device-identifying information. The UE executes the configuration installation file over the local connection to configure the network infrastructure device for operation on the communications network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
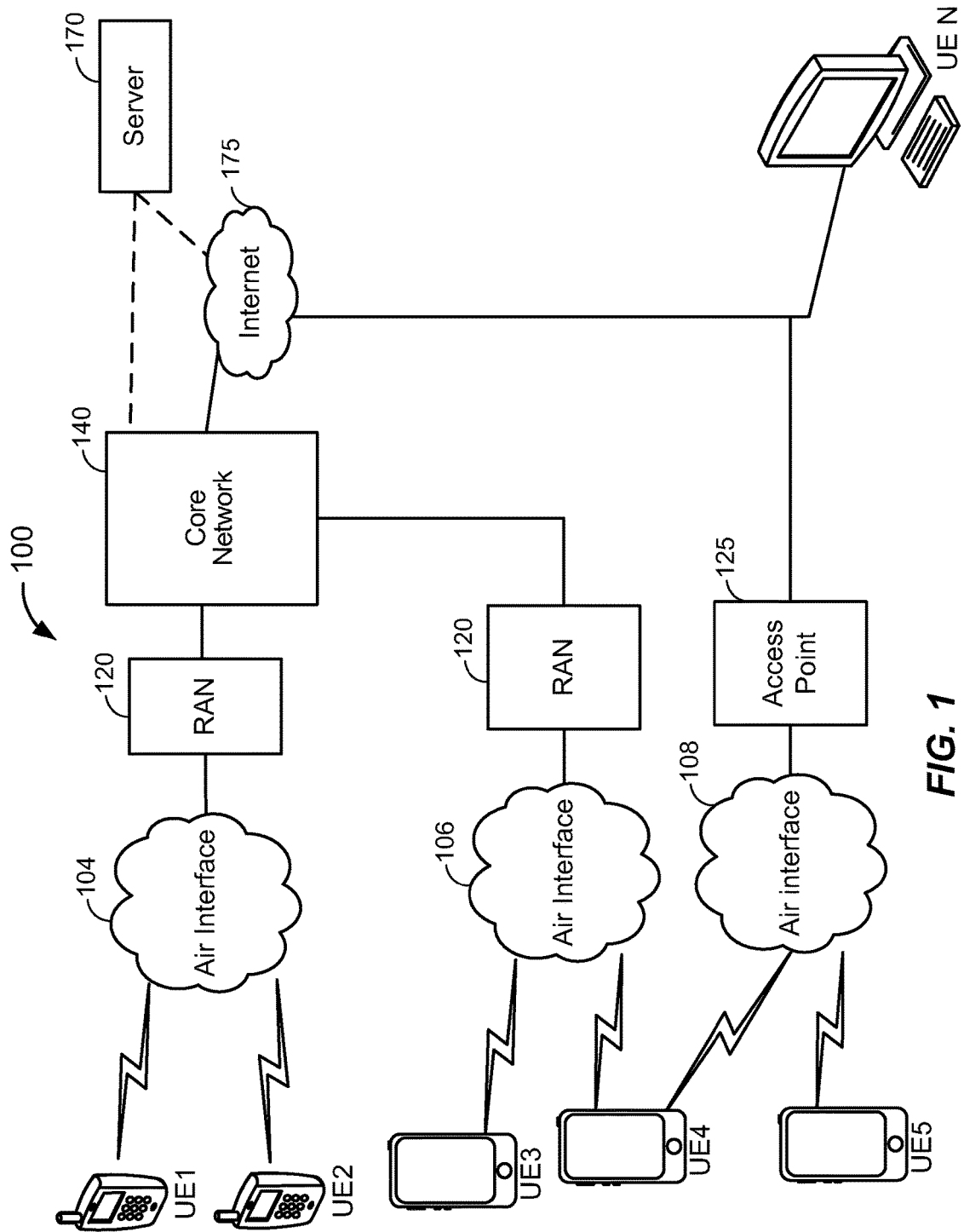
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistants (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
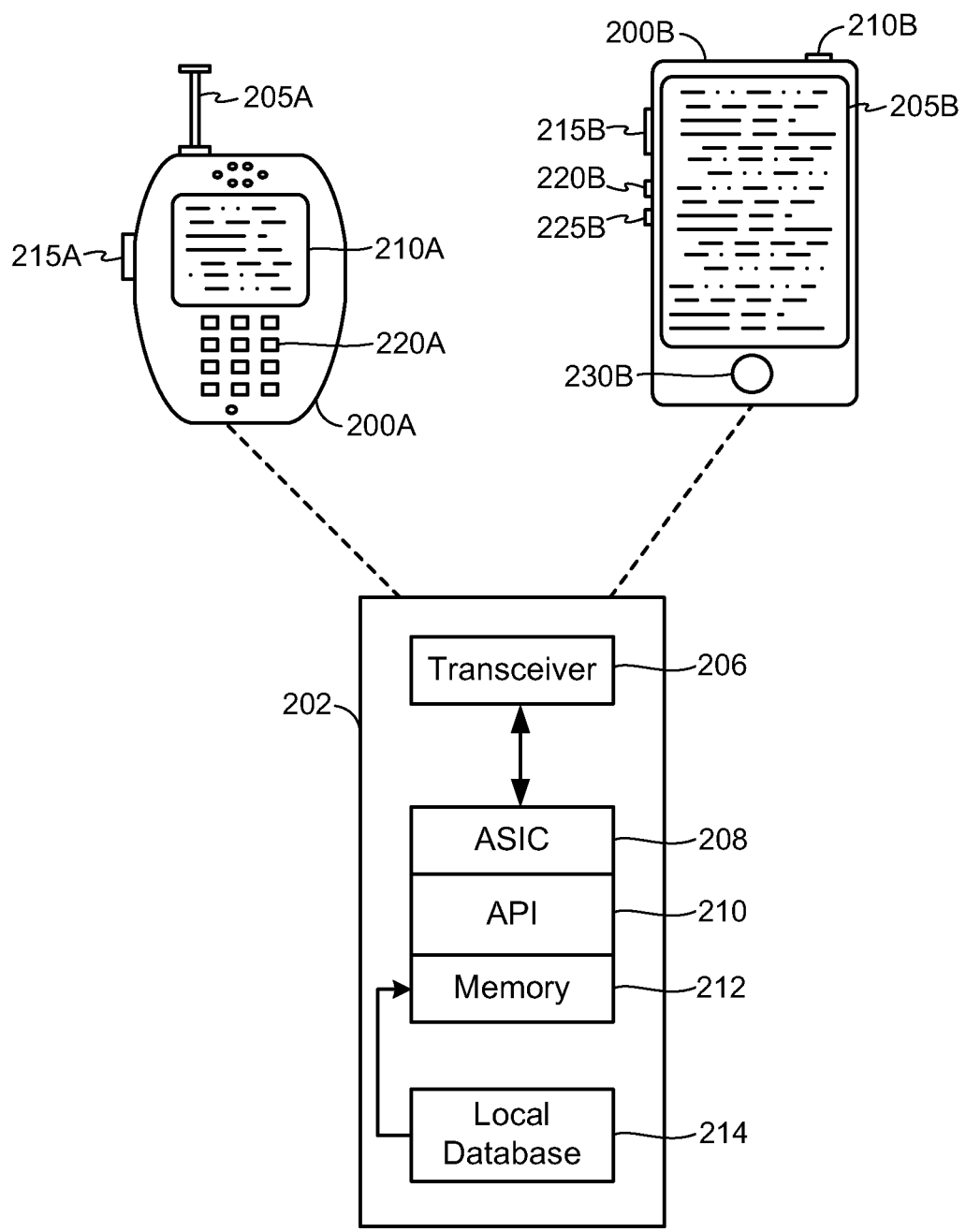
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the invention is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
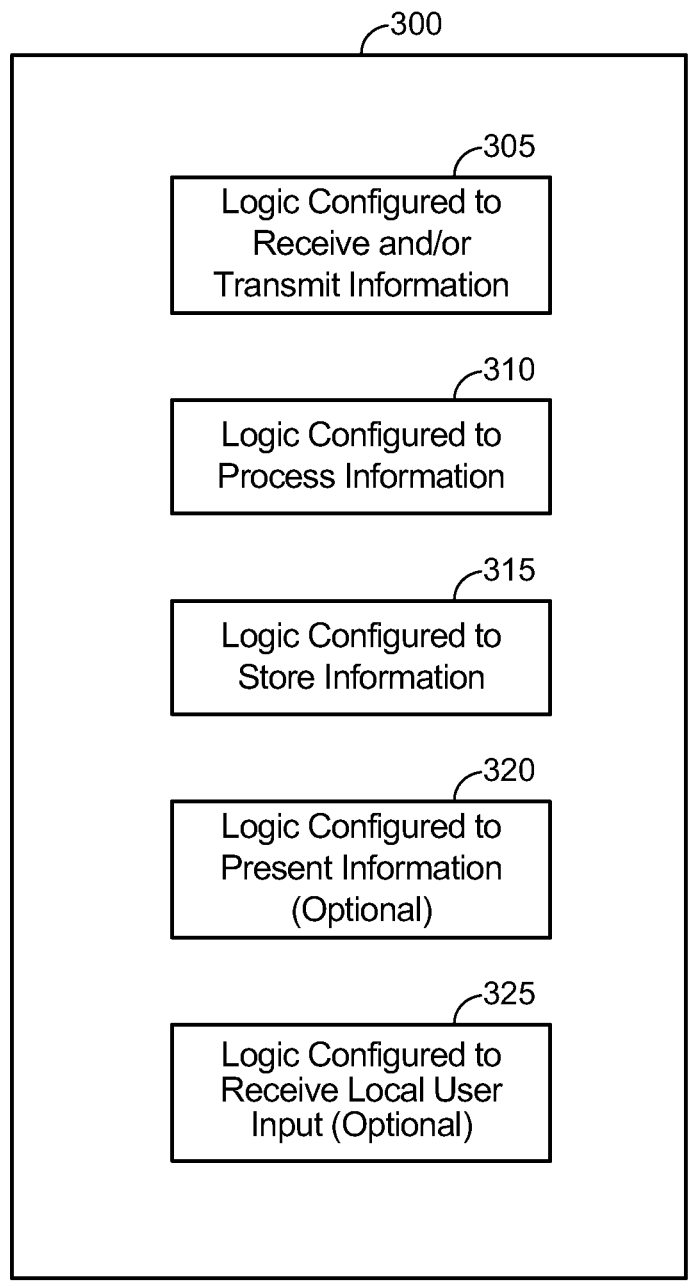
FIG. 3 illustrates a communication device that includes logic configured to perform functionality in accordance with an embodiment of the invention.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B, AP 125, a BS, Node B or eNodeB in the RAN 120, etc.), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., server 170, etc.), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM memory, flash memory, ROM memory, EPROM memory, EEPROM memory, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of UE 200A or the touchscreen display 205B of UE 200B. In a further example, the logic configured to present information 320 can be omitted for certain communication devices, such as network communication devices that do not have a local user (e.g., network switches or routers, remote servers such as the server 170, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. In a further example, the logic configured to receive local user input 325 can be omitted for certain communication devices, such as network communication devices that do not have a local user (e.g., network switches or routers, remote servers such as the server 170, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
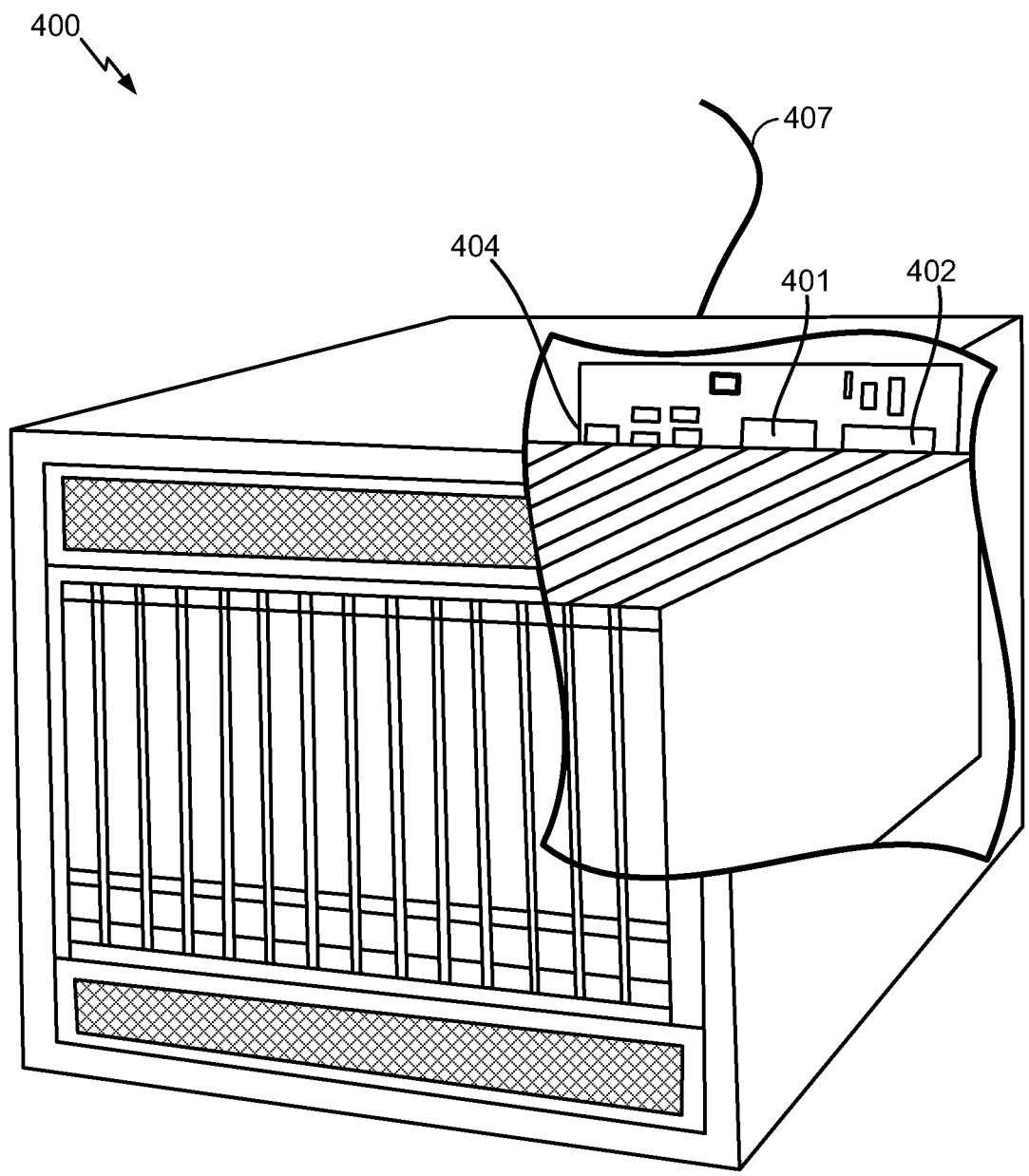
FIG. 4 illustrates a network infrastructure device in accordance with an embodiment of the invention.

The various embodiments may be implemented with respect to any of a variety of network infrastructure devices, such as network infrastructure device 400 illustrated in FIG. 4. In FIG. 4, the network infrastructure device 400 includes a processor 400 coupled to a memory 402. The network infrastructure device 400 may also include a floppy disc drive, compact disc (CD) or DVD disc drive 406 coupled to the processor 401. The network infrastructure device 400 may also include network access ports 404 coupled to the processor 401 for establishing data connections with a network 407, such as an IP backhaul or backbone network. In context with FIG. 3, it will be appreciated that the network infrastructure device 400 of FIG. 4 illustrates one example implementation of the communication device 300, whereby the logic configured to transmit and/or receive information 305 corresponds to the network access points 404 used by the network infrastructure device 400 to communicate with the network 407, the logic configured to process information 310 corresponds to the processor 401, and the logic configuration to store information 315 corresponds to the memory 402.

Network infrastructure devices, such as routers or switches, are deployed in various locations to implement network functions pertaining to a data network. Generally, these network infrastructure devices require custom configuration, with each network infrastructure device requiring a configuration that is suitable for its particular implementation. It is common for network infrastructure devices to be delivered to their installation location without being pre-configured for implementation. In other words, a technician at the installation location cannot simply connect the network infrastructure device to the data network and expect it to function properly. One reason for this procedure is that network infrastructure devices are generally associated with a high level of security, and technicians that are on-site at the installation location need to verify that the network infrastructure devices are operating correctly.

For this reason, the technician will typically configure the network infrastructure devices him/herself. The configuration can be implemented manually, whereby the technician will load a configuration tool and then navigate through a series of configuration screen menus until the configuration is complete. Alternatively, to expedite this procedure, the custom configurations for the network infrastructure devices can be loaded onto physical media, such as Universal Serial Bus (USB) sticks, and then labeled so that the technician will be able to associate each USB stick with its corresponding network infrastructure device. In this case, the custom configurations are generated in advance at a central site, which saves the technician time during the actual on-site installations. However, in a USB stick scenario, proper installation is dependent upon the USB sticks being labeled appropriately so that the technician not confuse the USB sticks and install the wrong configuration onto a network infrastructure device. Also, even if labeled appropriately, it can simply be difficult for the technician to keep track of a group of USB sticks if that technician has several installation jobs on his/her schedule.

Figure 5:
FIG. 5 illustrates an example of three installation locations for three different network infrastructure devices in accordance with an embodiment of the invention.

FIG. 5 illustrates an example of three installation locations for three different network infrastructure devices in accordance with an embodiment of the invention. In the example of FIG. 5, the three installation locations ("Location 1", "Location 2" and "Location 3") are shown as being located in Australia. Below, FIGS. 6-10C are described with respect to these particular installation locations, although it will be appreciated that any installation locations could be used in other embodiments of the invention.

Figure 6:
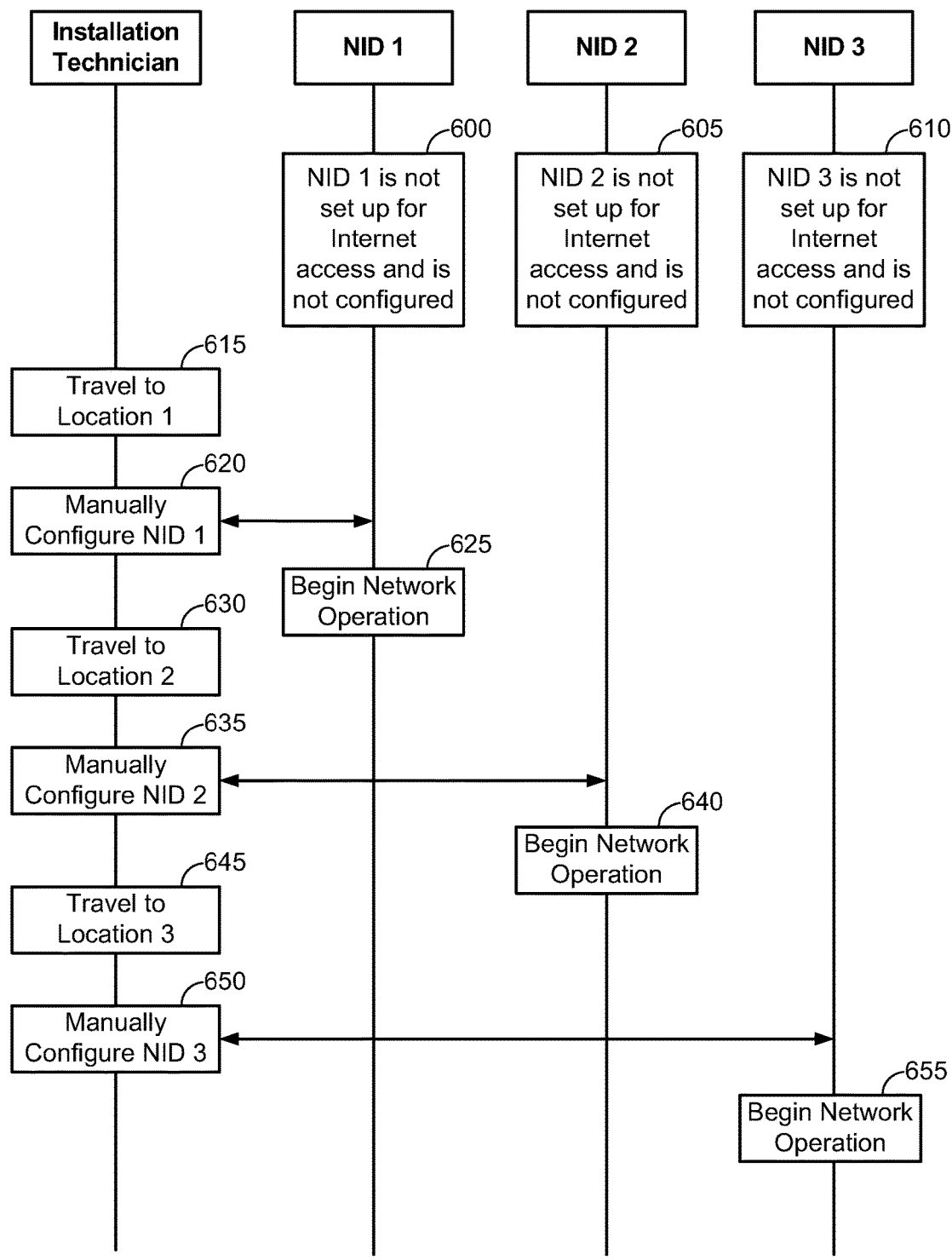
FIG. 6 illustrates a conventional process by which an installation technician can configure a set of secure network infrastructure devices.

FIG. 6 illustrates a conventional process by which an installation technician can configure a set of secure network infrastructure devices. Referring to FIG. 6, assume that the installation technician is scheduled to install network infrastructure device 1 ("NID 1"), network infrastructure device 2 ("NID 2") and network infrastructure device 3 ("NID 3"). Accordingly, at the beginning of FIG. 6, NID 1, NID 2 and NID 3 are each in a non-configured state and are not set-up for Internet access, 600, 605 and 610. For example, NIDs 1-3 may not have any assigned public or external IP addresses at 600-610, etc.

Referring to FIG. 6, the installation technician travels to Location 1, 615, where the installation technician manually configures NID 1, 620, after which NID 1 begins network operation, 625. As discussed above, the manual configuration process that occurs at 620 can be relatively time consuming, and can require the installation technician to connect to NID 1 with a laptop computer, load a NID configuration tool and then navigate through a series of configuration screen menus until the configuration of NID 1 is complete.

After NID 1 is configured and the installation technician confirms that its network operation is functioning properly, the installation technician travels to Location 2, 630, where the installation technician manually configures NID 2, 635, after which NID 2 begins network operation, 635. The manual configuration for NID 2 at 635 is implemented in a similar manner as the manual configuration for NID 1 at 620, although it will be appreciated that the actual configurations are different.

After NID 2 is configured and the installation technician confirms that its network operation is functioning properly, the installation technician travels to Location 3, 645, where the installation technician manually configures NID 3, 650, after which NID 3 begins network operation, 655. The manual configuration for NID 3 at 655 is implemented in a similar manner as the manual configurations for NID 1 at 620 and NID 2 at 635, although it will be appreciated that the actual configurations are different.

Figure 7A:
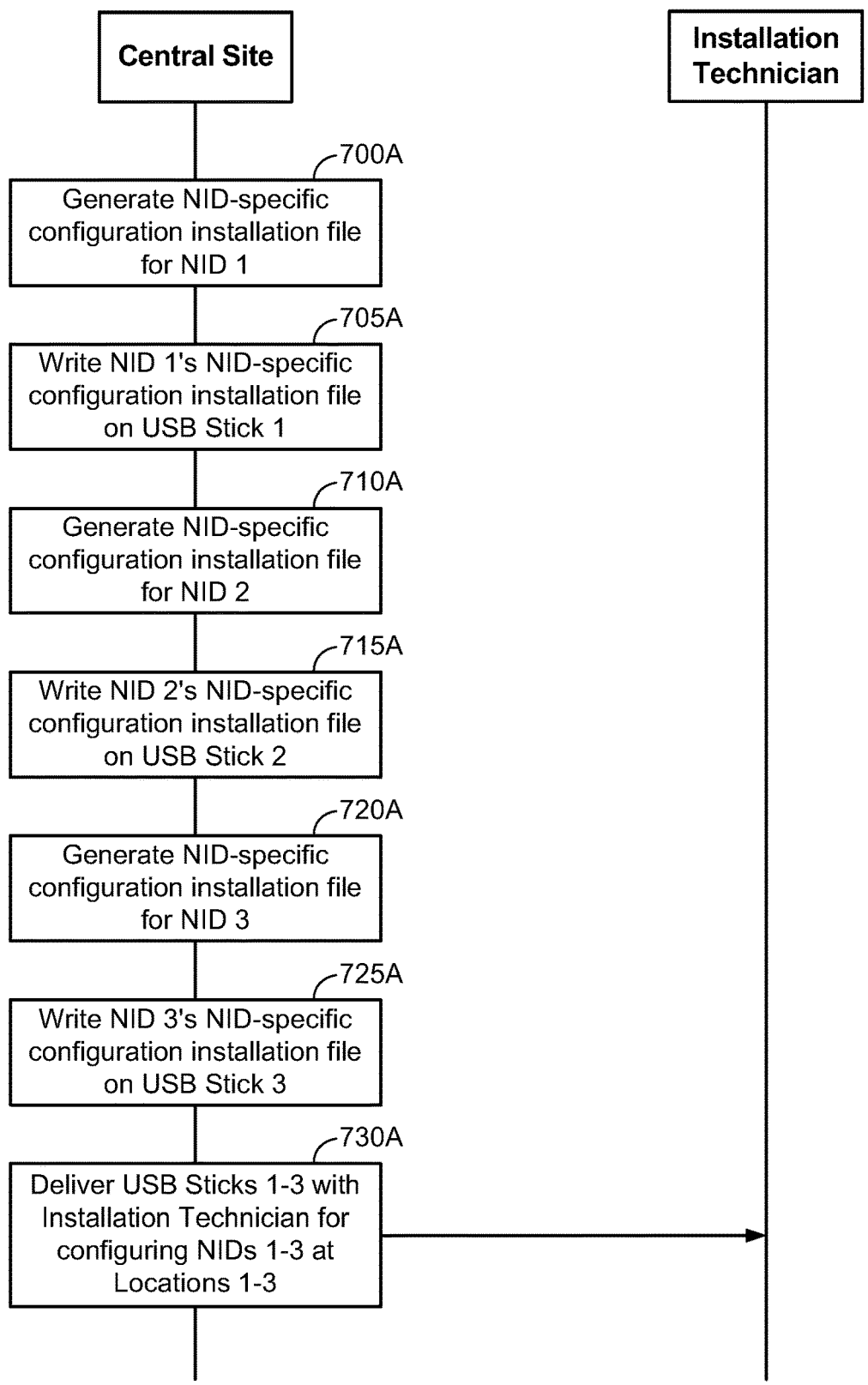
FIG. 7A illustrates a conventional process of pre-provisioning an installation technician's UE with network infrastructure device-specific configuration files for a set of network infrastructure devices.
Figure 7B:
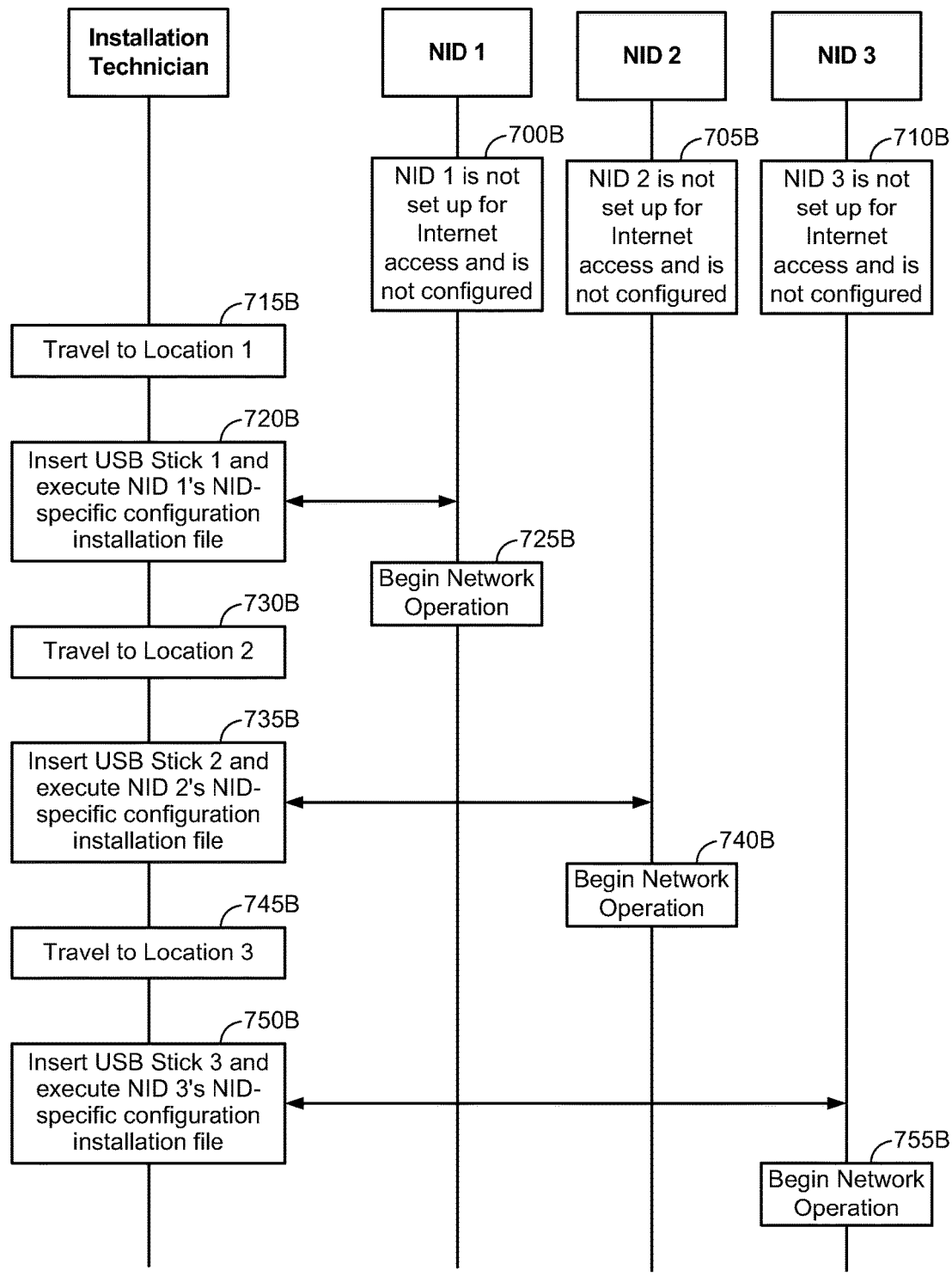
FIG. 7B illustrates a conventional on-site configuration procedure for a set of network infrastructure devices.

While FIG. 6 shows an example of a conventional manual configuration procedure for NIDs 1-3, the time duration of the on-site configuration procedure can be reduced via the use of USB sticks that are pre-loaded with the requisite custom configurations for NIDs 1-3, as shown in FIGS. 7A-7B.

Referring to FIG. 7A, an operator at a central site generates a NID-specific configuration installation file for NID 1, 700A, and then writes (or programs) NID 1's NID-specific configuration installation file onto a physical medium, 705A, such as a USB stick ("USB Stick 1"). The NID-specific configuration installation file for NID 1 is configured at 700A such that, upon execution by NID 1, NID 1 will be configured in the same manner as the manual configuration that occurred at 620 of FIG. 6. Thus, the NID-specific configuration installation file for NID 1 reduces the amount of time that the installation technician is required to spend "on-site" at Location 1 to set-up the proper configuration for NID 1. The operator at the central site generates a NID-specific configuration installation file for NID 2, 710A, and then writes (or programs) NID 2's NID-specific configuration installation file onto another USB stick ("USB Stick 2"), 715A. Similarly, the operator at the central site generates a NID-specific configuration installation file for NID 3, 720A, and then writes (or programs) NID 3's NID-specific configuration installation file onto another USB stick ("USB Stick 3"), 725A. After USB Sticks 1-3 are programmed between 700A-725A, the operator at the central site (which could theoretically correspond to the installation technician him/herself) delivers USB Sticks 1-3 to the installation technician for configuring NIDs 1-3 at Locations 1-3, 730A.

While not shown in FIG. 7A explicitly, each of the USB Sticks 1-3 can be labeled in a different manner so that the installation technician can distinguish between them. In this way, the installation technician will know, when on-site at the respective installation locations, that USB Stick 1 is associated with NID 1 at Location 1, USB Stick 2 is associated with NID 2 at Location 2 and USB Stick 3 is associated with NID 3 at Location 3.

Referring to FIG. 7B, assume that the installation technician is scheduled to install NIDs 1-3 and that NIDs 1-3 are each in a non-configured state and are not set-up for Internet access, 700B, 705B, 710B. For example, NIDs 1-3 may not have any assigned public or external IP addresses at 700B-710B, etc.

Referring to FIG. 7B, the installation technician travels to Location 1, 715B, where the installation technician inserts USB Stick 1 into NID 1, which prompts NID 1's NID-specific configuration installation file to self-execute and automatically configure NID 1, 720B, after which NID 1 begins network operation, 725B. As will be appreciated, the automated configuration that occurs at 720B is faster than the manual configuration process that occurs at 620 of FIG. 6.

After NID 1 is configured and the installation technician confirms that its network operation is functioning properly, the installation technician travels to Location 2, 730B, where the installation technician inserts USB Stick 2 into NID 2, which prompts NID 2's NID-specific configuration installation file to self-execute and automatically configure NID 2, 735B, after which NID 2 begins network operation, 740B. As will be appreciated, the automated configuration that occurs at 740B is faster than the manual configuration process that occurs at 640 of FIG. 6.

After NID 2 is configured and the installation technician confirms that its network operation is functioning properly, the installation technician travels to Location 3, 745B, where the installation technician inserts USB Stick 3 into NID 3, which prompts NID 3's NID-specific configuration installation file to self-execute and automatically configure NID 3, 750B, after which NID 2 begins network operation, 755B. As will be appreciated, the automated configuration that occurs at 750B is faster than the manual configuration process that occurs at 650 of FIG. 6.

While the USB stick option shown in FIGS. 7A-7B is faster than the manual configuration option shown in FIG. 6 in terms of on-site installation time duration, the USB stick option requires the installation technician to be provisioned with the proper USB sticks before traveling to the respective installation locations, and can increase confusion during installation in the sense that the installation technician needs to personally verify that the correct USB stick is used for each of NIDs 1-3.

With this in mind, embodiments of the invention are directed to a UE that is operated by the installation technician, whereby the UE is either pre-loaded with the NID-specific configuration installation files or can be dynamically downloaded the NID-specific configuration installation files while on-site. In particular, the USB stick association confusion can be reduced via a mechanism whereby the UE itself can detect information sufficient to verify the proper NID-specific configuration installation file for a NID to which the UE is connected. These embodiments will become more clear upon a review of FIGS. 8-10C, which are described below in detail.

Figure 8:
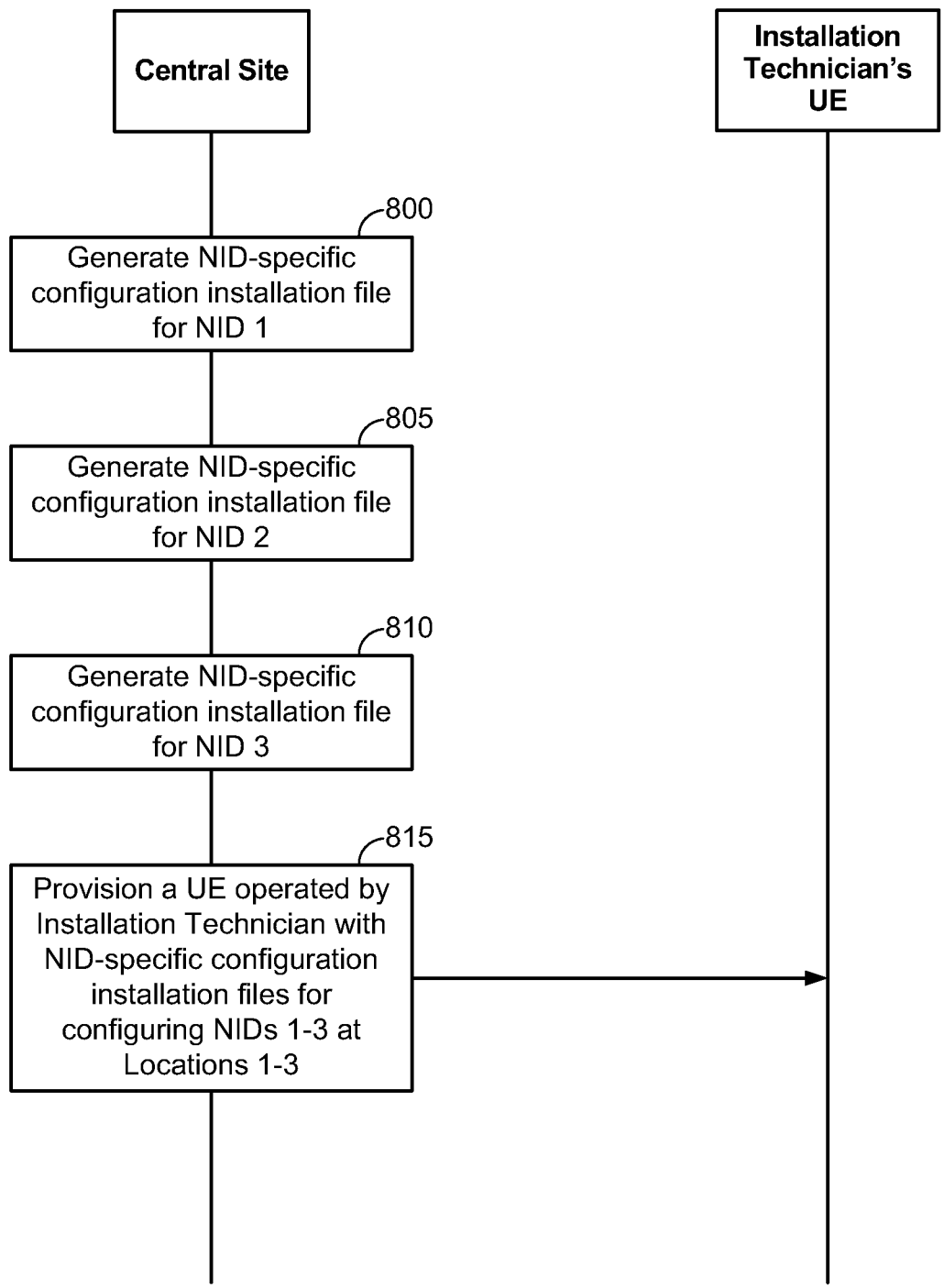
FIG. 8 illustrates a process of pre-provisioning an installation technician's UE with network infrastructure device-specific configuration files for a set of network infrastructure devices in accordance with an embodiment of the invention.

Referring to FIG. 8, an operator at a central site generates a NID-specific configuration installation file for NID 1, 800. Similar to 700A of FIG. 7A, the NID-specific configuration installation file for NID 1 is configured at 800 such that, upon execution by NID 1, NID 1 will be configured in the same manner as the manual configuration that occurred at 620 of FIG. 6. The operator at the central site also generates a NID-specific configuration installation file for NID 2, 805, and a NID-specific configuration installation file for NID 3, 810. Instead of programming three different USB sticks with the NID-specific configuration installation files for NIDs 1-3, the central site instead provisions a UE that is operated by the installation technician with the NID-specific configuration installation files for NIDs 1-3, 815.

The provisioning that occurs at 815 can be implemented in a number of different ways. For example, the provisioning of 815 can occur over a wired connection at the central site itself (e.g., to satisfy a high-security protocol), or alternatively the provisioning of 815 can occur remotely over a wired or wireless communications system (e.g., as illustrated in FIG. 1 for example), such that the UE remotely downloads one or more of the NID-specific configuration installation files for NIDs 1-3. In a further example, the installation technician's UE can be provisioned with a file management application that is configured to manage any number of NID-specific configuration installation files. Thus, after the provisioning of 815, the installation technician can access the file management application in order to manage on-site installations of the NID-specific configuration installation files for NIDs 1-3, in an example.

Figure 9:
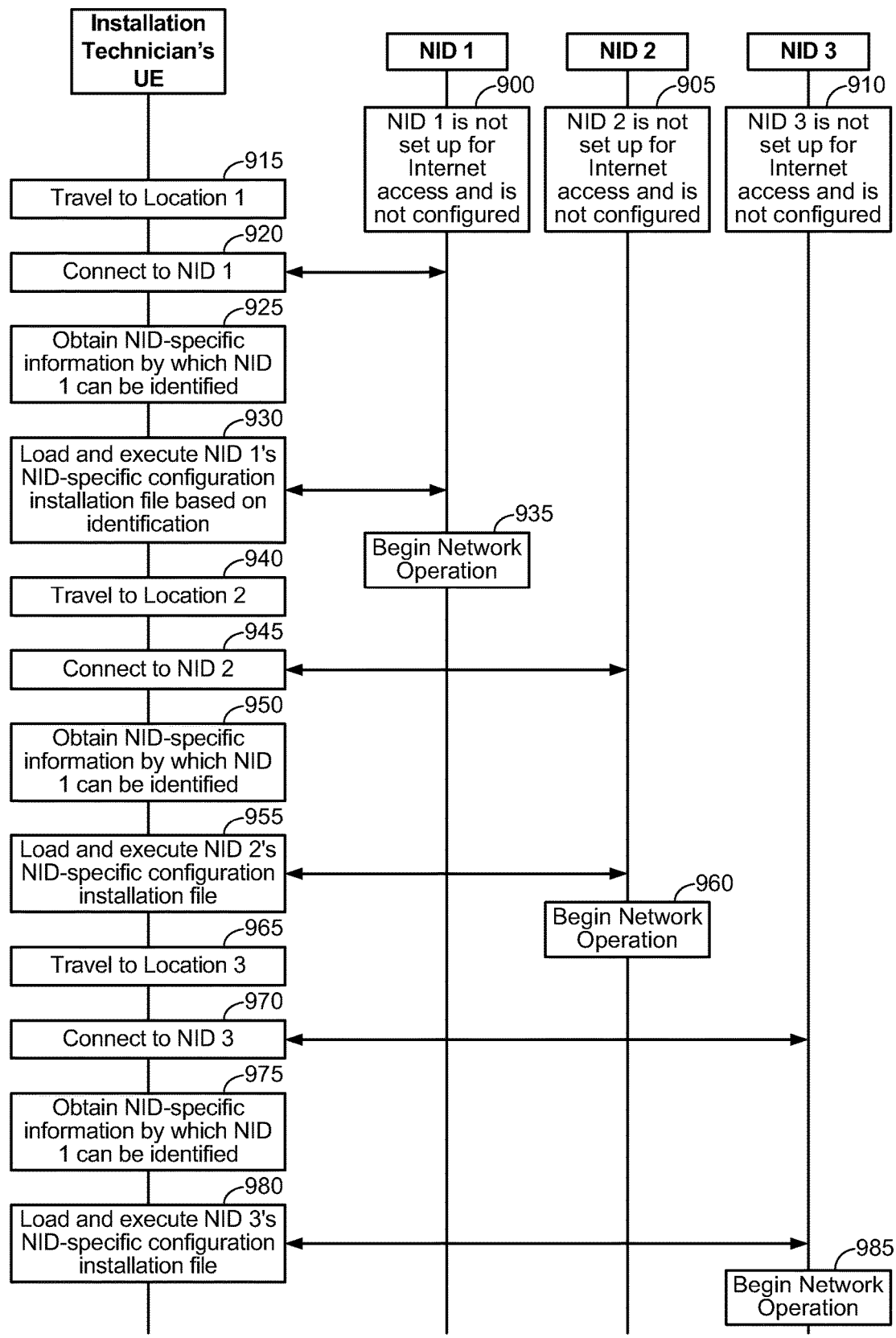
FIG. 9 illustrates an on-site configuration procedure for a set of network infrastructure devices in accordance with an embodiment of the invention.

Referring to FIG. 9, assume that the installation technician is scheduled to install NIDs 1-3 and that NIDs 1-3 are each in a non-configured state and are not set-up for Internet access, 900, 905 and 910. For example, NIDs 1-3 may not have any assigned public or external IP addresses at 900-910, etc.

Referring to FIG. 9, the installation technician travels with his/her UE to Location 1, 915. While at Location 1, the installation technician connects the UE to NID 1, 920. The connection of 920 can correspond to a wired connection (e.g., via a USB or Firewire cable, etc.) or a local wireless connection (e.g., Bluetooth, etc.). At 925, the UE obtains NID-specific information by which NID 1 can be identified (either locally at the UE or remotely by the central site), 925. In an example, the NID-specific information that is used to identify NID 1 can include location information. For example, the UE can execute a position determination procedure (e.g., GPS, etc.) to determine its location while connected to NID 1, the UE can determine that it is located at Location 1 based on its determined location and the UE can then identify NID 1 as the NID to which the UE is currently connected based on a known association between Location 1 and NID 1. In an alternative example, the NID-specific information can include any type of identifying information acquired via the connection established at 920, including but not limited to a name of NID 1, a media access control (MAC) address of NID 1, a pre-provisioned IP address of NID 1, a serial number or device code or NID 1, etc. Once NID 1 is identified at 925, the NID-specific configuration installation file corresponding to NID 1 can be loaded onto NID 1 via the connection and then executed to automatically configure NID 1, 930, after which NID 1 begins network operation, 935.

After NID 1 is configured and the installation technician confirms that its network operation is functioning properly, the installation technician travels with his/her UE to Location 2, 940. While at Location 2, the installation technician connects the UE to NID 2, 945 (e.g., similar to 920), and the UE obtains NID-specific information by which NID 2 can be identified (either locally at the UE or remotely by the central site), 950 (e.g., similar to 925). At this point, the NID-specific configuration installation file corresponding to NID 2 can be loaded onto NID 2 via the connection and then executed to automatically configure NID 2, 955 (e.g., similar to 930), after which NID 2 begins network operation, 960 (e.g., similar to 935).

After NID 2 is configured and the installation technician confirms that its network operation is functioning properly, the installation technician travels with his/her UE to Location 3, 965. While at Location 3, the installation technician connects the UE to NID 3, 970 (e.g., similar to 920), and then obtains NID-specific information by which NID 3 can be identified (either locally at the UE or remotely by the central site), 975 (e.g., similar to 925). At this point, the NID-specific configuration installation file corresponding to NID 3 can be loaded onto NID 3 via the connection and then executed to automatically configure NID 3, 980 (e.g., similar to 930), after which NID 3 begins network operation, 985 (e.g., similar to 935).

Figure 10A:
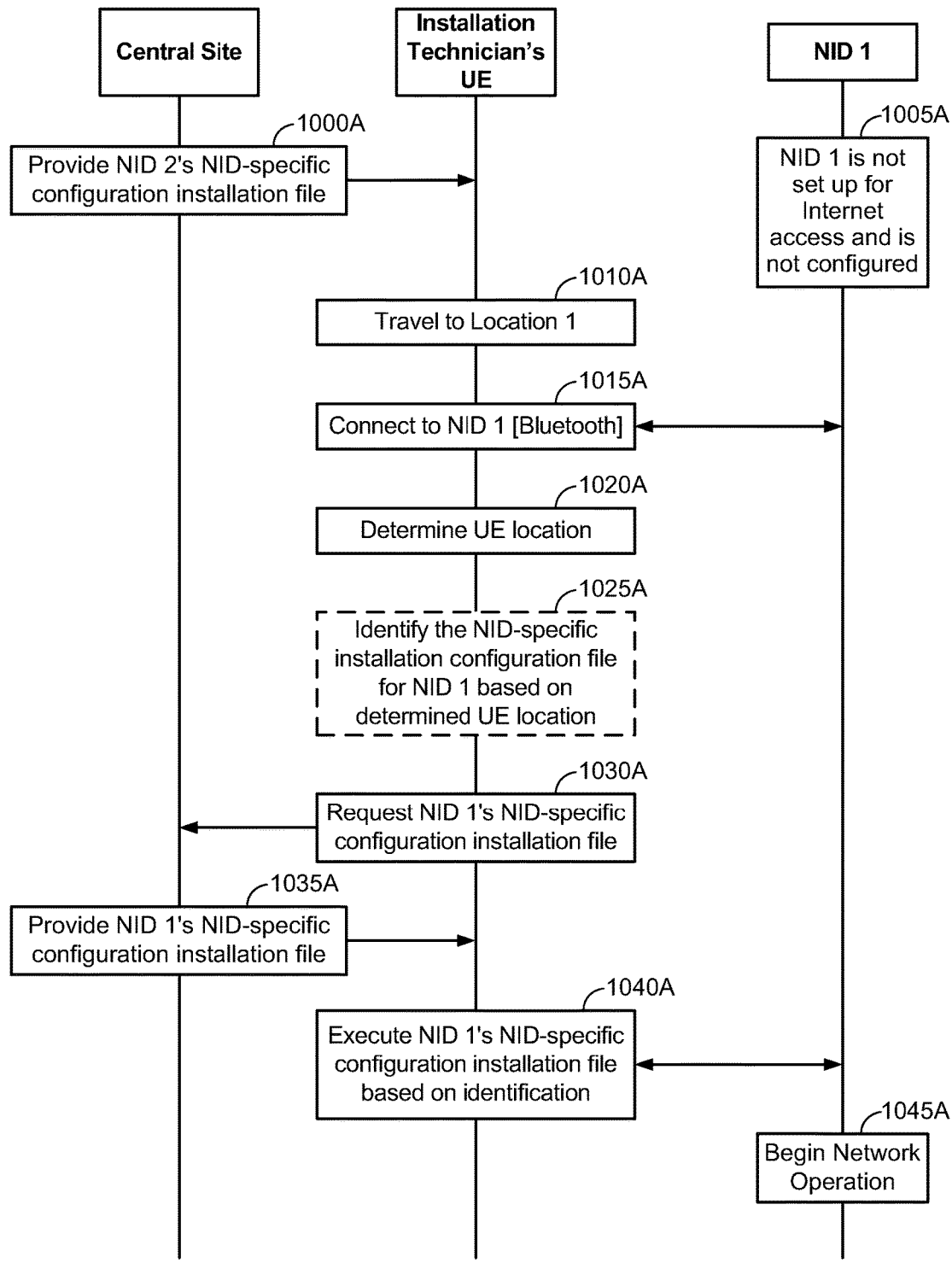
FIGS. 10A-10C illustrate an example implementation of the process of FIG. 9 in accordance with an embodiment of the invention.
Figure 10B:
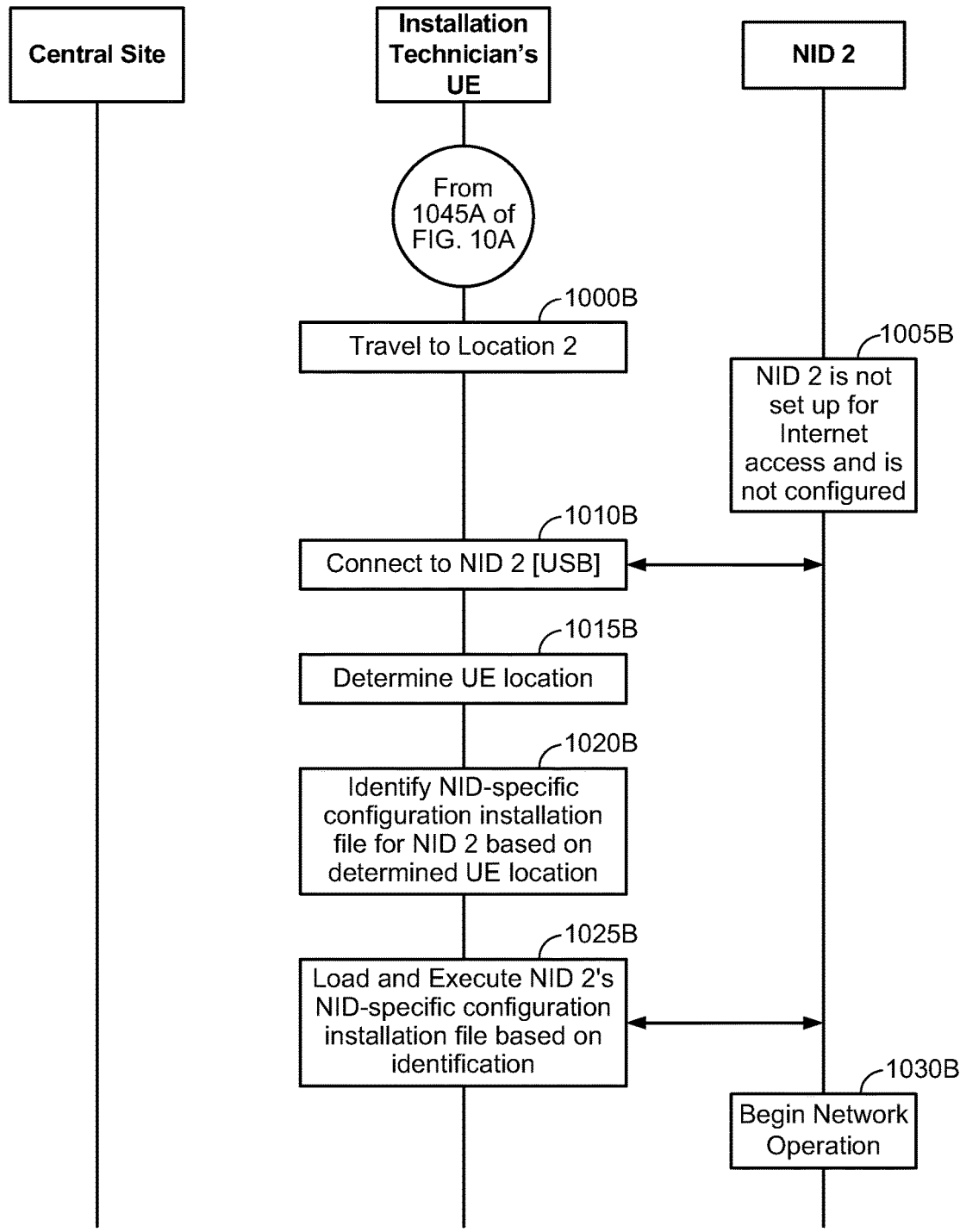
Figure 10C:
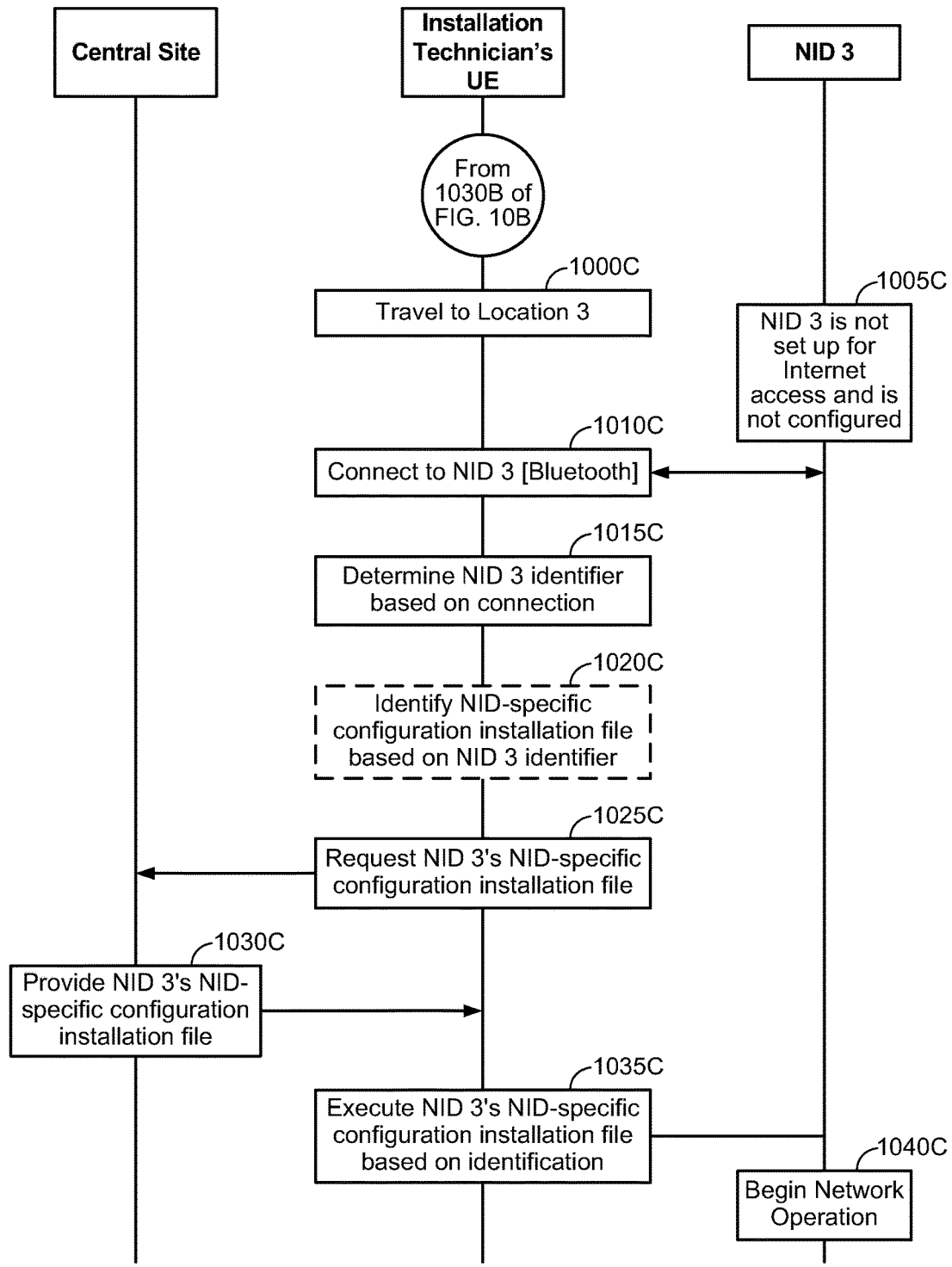

FIGS. 10A-10C illustrate an example implementation of the process of FIG. 9 in accordance with an embodiment of the invention.

Referring to FIG. 10A, assume that the central site provisions NID 2's NID-specific configuration installation file onto the installation technician's UE before the installation technician departs to any of the installation locations, but that the central site does not pre-provision the NID-specific configuration installation files for NID 1 or NID 3, 1000A. As will be appreciated, the direct provisioning of NID 2's NID-specific configuration installation file at 1000A corresponds to one manner by which 815 of FIG. 8 can be implemented. Also, similar to 900 of FIG. 9, the installation technician is scheduled to configure NID 1 and NID 1 is in a non-configured state and is not set-up for Internet access, 1005A. For example, NID 1 may not have any assigned public or external IP address at 1005A, etc.

Referring to FIG. 10A, the installation technician travels with his/her UE to Location 1, 1010A. While at Location 1, the installation technician connects the UE to NID 1 via Bluetooth, 1015A. The UE and NID 1 do not need to be paired prior to establishment of the Bluetooth connection at 1015A. Instead, the connection of 1015A can result from a Bluetooth discovery procedure implemented by the UE after the installation technician arrives at Location 1 with the UE and approaches NID 1.

Referring to FIG. 10A, the UE determines its location while connected to NID 1 via the local Bluetooth connection, 1020A. For example, the location determination at 1020A can correspond be based upon GPS, RF signature, a hybrid of cellular and GPS, via a remote position determination entity (PDE) (not shown), or any other well-known location determination technique. Based on the UE's determined location from 1020A, the UE can optionally identify the NID-specific installation configuration file for NID 1 based on the determined location, 1025A. 1025A is considered optional because the UE could instead simply report its location to the central site (or affiliated server) and rely upon the central site (or affiliated server) to identify the appropriate NID-specific installation configuration file for NID 1 based on the UE's location. Thus, the mapping of NID-specific installation configuration file to location can be implemented at the UE itself, or at an external device, such as a server at the central site. As will be appreciated, 1020A or the combination of 1020A with 1025A may correspond to an example implementation of 925 of FIG. 9.

Because the UE is not provisioned with NID 1's NID-specific configuration installation file at 1000A, the UE requests NID 1's NID-specific configuration installation file from the central site (or a server affiliated with the central site), 1030A. The central site (or affiliated server) provides NID 1's NID-specific configuration installation file in response to the request, 1035A. The signaling exchanged between the UE and central site at 1030A and 1035A can occur over a communication system as shown in FIG. 1 for example. In an example, the request of 1030A can report the UE location with the expectation that the central site will use the reported location to identify NID 1 based on the reported location and then look-up the appropriate NID-specific configuration installation file. Alternatively, the request of 1030A can more explicitly indicate the NID-specific installation configuration file for NID 1 if the UE is capable of identifying the NID-specific installation configuration file for NID 1 via the UE location or some other mechanism. Once the NID-specific configuration installation file for NID 1 is obtained at 1035A, the NID-specific configuration installation file corresponding to NID 1 can be loaded onto NID 1 via the connection and then executed to automatically configure NID 1, 1040A, after which NID 1 begins network operation, 1045A. As will be appreciated, 1030A-1040A corresponds to an example implementation of 930 of FIG. 9, while 1045A corresponds to an example implementation of 935 of FIG. 9.

Turning to FIG. 10B, after NID 1 is configured and the installation technician confirms that its network operation is functioning properly at 1045A, the installation technician travels with his/her UE to Location 2, 1000B. Similar to 905 of FIG. 9, at this point NID 2 is in a non-configured state and is not set-up for Internet access, 1005B. For example, NID 2 may not have any assigned public or external IP address at 1005B, etc.

While at Location 2, the installation technician connects the UE to NID 2 via a local wired connection such as USB, 1010B. The UE determines its location while connected to NID 2 via the local wired connection, 1015B (e.g., similar to 1020A of FIG. 10A). Based on the UE's determined location from 1015B, the UE identifies the NID-specific installation configuration file for NID 2 based on the determined location, 1020B. Unlike 1025A of FIG. 10A, the identification of 1020B is not considered optional because the UE does not interact with the central site during the process of FIG. 10B. Instead, the UE itself identifies the NID-specific installation configuration file for NID 2 based at least in part upon the UE's determination location from 1015B (e.g., based on a location association that is programmed into the UE for NID 2 in addition to NID 2's NID-specific installation configuration file at 1000A of FIG. 10A). As will be appreciated, 1020B corresponds to an example implementation of 950 of FIG. 9.

Because the UE is provisioned with NID 2's NID-specific configuration installation file at 1000A, the UE does not need to request NID 2's NID-specific configuration installation file from the central site (or a server affiliated with the central site) after identifying the NID-specific installation configuration file for NID 2 at 1020B. Instead, the pre-provisioned NID-specific configuration installation file corresponding to NID 2 is loaded onto NID 2 via the connection and then executed to automatically configure NID 2, 1025B, after which NID 2 begins network operation, 1030B. As will be appreciated, 1025B corresponds to an example implementation of 955 of FIG. 9, while 1030B corresponds to an example implementation of 960 of FIG. 9.

Turning to FIG. 10C, after NID 2 is configured and the installation technician confirms that its network operation is functioning properly at 1030B, the installation technician travels with his/her UE to Location 3, 1000C. Similar to 910 of FIG. 9, at this point NID 3 is in a non-configured state and is not set-up for Internet access, 1005C. For example, NID 3 may not have any assigned public or external IP address at 1005C, etc.

While at Location 3, the installation technician connects the UE to NID 3 via Bluetooth, 1010C (e.g., similar to 1015A of FIG. 10A). At 1015C, instead of determining the UE's location to identify the NID-specific installation configuration file for NID 3 as in 1020A of FIG. 10A, the UE instead acquires NID-identifying information over the Bluetooth connection from 1010C. The NID-identifying information (or NID 3 identifier) can correspond to any type of information pre-provisioned onto NID 3 for identification, such as a MAC address of NID 3, an internal IP address assigned to NID 3, a hardware serial number or device code, etc. Based on the NID 3 identifier from 1015C, the UE can optionally identify the NID-specific configuration installation file for NID 3, 1020C. 1020C is considered optional because the UE could instead simply report the NID 3 identifier to the central site (or affiliated server) and rely upon the central site (or affiliated server) to identify NID 3's NID-specific configuration installation file based on the NID 3 identifier. Thus, the mapping of NID-specific configuration installation file to NID identifier can be implemented at the UE itself, or at an external device, such as a server at the central site. As will be appreciated, 1015C or the combination of 1015C with 1020C may correspond to an example implementation of 925 of FIG. 9.

At this point 1025C-1040C substantially correspond to 1030A-1045A of FIG. 10A, and will not be described further for the sake of brevity. However, it is noted that the request at 1030A of FIG. 10A can include either the UE location (1020A) or an indication of the identified NID-specific configuration installation file (1025A), while the request at 1025C can include either the NID 3 identifier (1015C) or the indication of the identified NID-specific configuration installation file (1020C).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of configuring a network infrastructure device with a user equipment (UE), comprising:
   prior to arrival at one of a plurality of locations each with an associated network infrastructure device comprising one of a network switch and router with security requiring on-site configuration, obtaining and pre-storing, at a central site which is different from the plurality of locations, a plurality of configuration installation files each for the associated network infrastructure device on the UE, wherein the plurality of configuration installation files are each associated with a respective one of a plurality of network infrastructure devices and located on a server at the central site, wherein the obtaining and pre-storing downloads the plurality of configuration installation files from the server to the UE for the plurality of network infrastructure devices with associated device-identifying information for each configuration installation file;
   subsequent to arrival at a location, establishing a local connection to a network infrastructure device at the location that is not yet configured for operation on a communications network;
   obtaining, while connected to the network infrastructure device over the local connection, device-identifying information by which the network infrastructure device can be distinguished from other network infrastructure devices either locally at the UE or remotely by the central site;

loading in memory of the network infrastructure device a configuration installation file that is specially configured for the network infrastructure device from the plurality of configuration installation files, based on a comparison between the obtained device-identifying information and the associated device-identifying information for each configuration installation file; and causing execution of the configuration installation file over the local connection to automatically configure the network infrastructure device for operation on the communications network, wherein the network infrastructure device begins operation on the communications network after configuration by the configuration installation file, and subsequently, confirming proper functioning of the network infrastructure device, wherein, prior to the establishing and until automatically configured, the network infrastructure device is in a non-configured state and not set-up for Internet access and the local connection is direct between the UE and the network infrastructure device.

2. The method of claim 1, wherein the loading includes:
transmitting a request for the configuration installation file to an external entity; and
receiving the configuration installation file from the external entity in response to the request.

3. The method of claim 2, wherein the transmitted request includes the device-identifying information to permit the external entity to identify the configuration installation file for delivery to the UE.

4. The method of claim 2, further comprising:
identifying the configuration installation file based on the device-identifying information, wherein the transmitted request includes an indication of the configuration installation file based on the identifying.

5. The method of claim 1, wherein the local connection is a wired connection.

6. The method of claim 5, wherein the wired connection is a Universal Serial Bus (USB) connection.

7. The method of claim 1, wherein the device-identifying information corresponds to a location of the UE that is determined by execution of a positioning procedure executed at the UE.

8. The method of claim 7, wherein the positioning procedure is a global positioning system (GPS) positioning procedure.

9. The method of claim 1, wherein the device-identifying information corresponds to a pre-provisioned identifier that is assigned to the network infrastructure device and is acquired by the UE over the local connection.

10. The method of claim 9, wherein the pre-provisioned identifier is a media access control (MAC) address, an Internet Protocol (IP) address, device code or a serial number.

11. The method of claim 1, wherein the local connection is a wireless connection.

12. The method of claim 1, wherein the configuration installation file is stored locally on the UE prior to the establishment of the local connection, and wherein the configuration installation file is identified based on the device-identifying information.

13. The method of claim 1, wherein the network infrastructure device corresponds to a network switch or router in a backbone or backhaul portion of the communications network.

14. The method of claim 1, wherein the UE is provisioned with a file management application that is configured to manage configuration installation files for configuring a plurality of network infrastructure devices.

15. A user equipment (UE) adapted to configure a network infrastructure device, comprising:
a processor configured to execute:
logic configured to obtain and pre-store, prior to arrival at one of a plurality of locations each with an associated network infrastructure device comprising one of a network switch and router with security requiring on-site configuration, at a central site which is different from the plurality of locations, a plurality of configuration installation files each for the associated network infrastructure device on the UE, wherein the plurality of configuration installation files are each associated with a respective one of a plurality of associated network infrastructure devices and located on a server at the central site, and wherein the obtain and pre-store downloads the plurality of configuration installation files from the server to the UE for the plurality of network infrastructure devices with associated device-identifying information for each configuration installation file;
logic configured to establish, subsequent to arrival at a location, a local connection to a network infrastructure device at the location that is not yet configured for operation on a communications network;
logic configured to obtain, while connected to the network infrastructure device over the local connection, device-identifying information by which the network infrastructure device can be distinguished from other network infrastructure devices either locally at the UE or remotely by the central site;
logic configured to load in memory of the network infrastructure device a configuration installation file that is specially configured for the network infrastructure device from the plurality of configuration installation files, based on a comparison between the obtained device-identifying information and the associated device-identifying information for each configuration installation file; and
logic configured to cause execution of the configuration installation file over the local connection to automatically configure the network infrastructure device for operation on the communications network, wherein the network infrastructure device begins operation on the communications network after configuration by the configuration installation file, and subsequently, confirming proper functioning of the network infrastructure device;
wherein, prior to establishment of the local connection and until automatically configuration, the network infrastructure device is in a non-configured state and not set-up for Internet access and the local connection is direct between the UE and the network infrastructure device.

16. The method of claim 15, wherein the device-identifying information corresponds to a location of the UE that is determined by execution of a positioning procedure executed at the UE.

17. The method of claim 15, wherein the device-identifying information corresponds to a pre-provisioned identifier that is assigned to the network infrastructure device and is acquired by the UE over the local connection.

18. The method of claim 15, wherein the network infrastructure device corresponds to a network switch or router in a backbone or backhaul portion of the communications network.

19. A non-transitory computer-readable medium comprising instructions, which, when executed by a user equipment (UE) adapted to configure a network infrastructure device, cause the UE to perform operations comprising:

prior to arrival at one of a plurality of locations each with an associated network infrastructure device comprising one of a network switch and router with security requiring on-site configuration, obtaining and pre-storing, at a central site which is different from the plurality of locations, a plurality of configuration installation files each for the associated network infrastructure device on the UE, wherein the plurality of configuration installation files are each associated with a respective one of a plurality of associated network infrastructure devices and located on a server at the central site, wherein the obtaining and pre-storing downloads the plurality of configuration installation files from the server to the UE for the plurality of network infrastructure devices with associated device-identifying information for each configuration installation file;

subsequent to arrival at a location, causing the UE to establish a local connection to a network infrastructure device at the location that is not yet configured for operation on a communications network;

causing the UE to obtain, while connected to the network infrastructure device over the local connection, device-identifying information by which the network infrastructure device can be distinguished from other network infrastructure devices either locally at the UE or remotely by the central site;

causing the UE to load in memory of the network infrastructure device a configuration installation file that is specially configured for the network infrastructure device from the plurality of configuration installation files, based on a comparison between the obtained device-identifying information and the associated device-identifying information for each configuration installation file; and causing the UE to self-execute the configuration installation file over the local connection to automatically configure the network infrastructure device for operation on the communications network, wherein the network infrastructure device begins operation on the communications network after configuration by the configuration installation file, and subsequently, confirming proper functioning of the network infrastructure device by a technician, wherein, prior to the establishing and until automatically configured, the network infrastructure device is in a non-configured state and not set-up for Internet access and the local connection is direct between the UE and the network infrastructure device.

* * * * *